United States Patent
Walker

(10) Patent No.: US 7,290,160 B2
(45) Date of Patent: Oct. 30, 2007

(54) METHOD AND APPARATUS TO DESKEW DATA TO CLOCK FOR MEMORY

(75) Inventor: Clinton Walker, Portland, OR (US)

(73) Assignee: Intel Corporation, Santa Clara, CA (US)

(*) Notice: Subject to any disclaimer, the term of this patent is extended or adjusted under 35 U.S.C. 154(b) by 420 days.

(21) Appl. No.: 10/996,936

(22) Filed: Nov. 23, 2004

(65) Prior Publication Data

US 2006/0112294 A1    May 25, 2006

(51) Int. Cl.
G06F 13/42 (2006.01)
G11C 7/00 (2006.01)

(52) U.S. Cl. .............. 713/401; 365/193; 365/194
(58) Field of Classification Search ........... 713/400, 713/401; 324/537; 365/193, 194
See application file for complete search history.

(56) References Cited

U.S. PATENT DOCUMENTS

| 6,646,929 B1* | 11/2003 | Moss et al. ............... 365/194 |
| 6,693,436 B1* | 2/2004 | Nelson .................... 324/537 |
| 6,789,209 B1* | 9/2004 | Suzuki et al. ............ 713/401 |
| 6,795,931 B1* | 9/2004 | LaBerge .................. 713/401 |
| 6,930,932 B2* | 8/2005 | Rentschler .............. 365/193 |
| 2001/0046163 A1* | 11/2001 | Yanagawa .............. 365/194 |

FOREIGN PATENT DOCUMENTS

| JP | 2001331365 A | * 11/2001 |
| JP | 2003173290 A | * 6/2003 |
| JP | 2004220643 A | * 8/2004 |

* cited by examiner

*Primary Examiner*—Suresh K Suryawanshi
(74) *Attorney, Agent, or Firm*—Trop, Pruner & Hu, P.C.

(57) ABSTRACT

A description of deskewing data from the clock from a DRAM, such as, but not limited to a DDR3 DRAM is discussed. For example, the differential signals of a strobe and a clock signal are used to create a first and second loops that can be fed back to a memory controller. The two loops are then compared and a delay is added to the strobe until it matches the delay time of the clock.

10 Claims, 3 Drawing Sheets

METHOD AND APPARATUS TO DESKEW DATA TO CLOCK FOR MEMORY

BACKGROUND OF THE INVENTION

1. Field of the Invention

The present invention relates to deskew data to clock for a dynamic random access memory (DRAM).

2. Background Information

A Dynamic Random Access Memory, DRAM, is a typical memory to store information for computers and computing systems, such as, personal digital assistants and cellular phones. DRAMs contain a memory cell array having a plurality of individual memory cells; each memory cell is coupled to one of a plurality of sense amplifiers, bit lines, and word lines. The memory cell array is arranged as a matrix of rows and columns, and the matrix is further subdivided into a number of banks.

One type of DRAM is a synchronous dynamic random access memory (SDRAM) that may allow for synchronous operation with a processor. Specific types of SDRAM are a single data rate (SDR) SDRAM and a double data rate (DDR) SDRAM. For example, a present DDR memory type is DDR3. Typically, a DDR DRAM may send data (DQ), when enabled by a DQS clock signal, to a memory controller or memory controller hub (MCH). The memory controller or MCH may receive the data from the DDR DRAM by utilizing precision delay cells to provide a delayed DQS clock signal.

Typically, the clock and strobe topology are extremely different topologies for DDR3. Nonetheless, they still have to meet the same clock to strobe timings. Due to the topology differences the flight time differences become too great to still meet these timings structure. Two present solutions for this problem are as follows. A first solution is matching the data flight times to the Clock by length matching. In contrast, a second solution is for the DRAM utilizing a flop with the clock as a first input and with strobe as a clock input of the flop. Consequently, the flop drives a signal back to a memory controller using a data signal during a calibration procedure. Subsequently, the memory controller moves the strobe around until the delay matches the flight time difference.

However, the preceding solutions add error to the calibration procedure.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to validation of integrated devices. As previously described, the clock and strobe topology are extremely different topologies for DDR3. Nonetheless, they still have to meet the same clock to strobe timings. The prior art solutions previously described add error to the calibration procedure.

In contrast, a method and apparatus is disclosed to deskew data from the clock from a DRAM, such as, but not limited to a DDR3 DRAM. The claimed subject matter facilitates using the differential signals of the strobe and clock to create a first and second loops that can be fed back to the controller. The two loops are then compared and a delay is added to the strobe until it matches the loop time of the clock.

Figure 1:
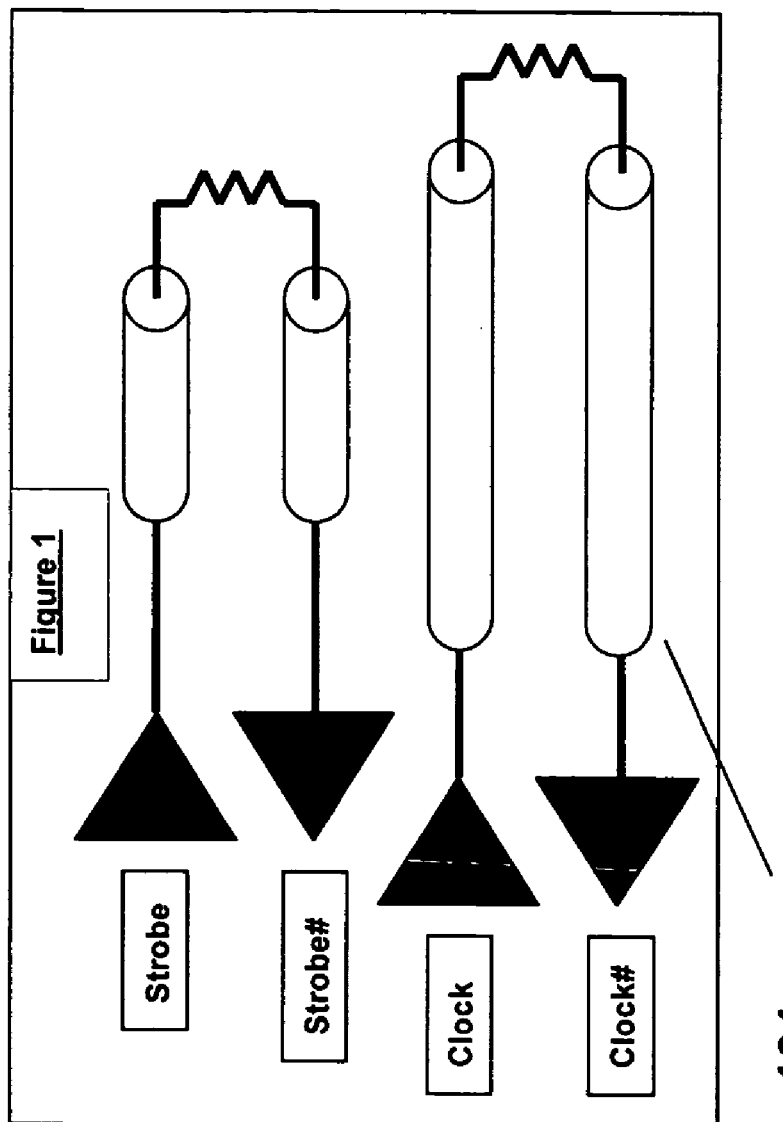
FIG. 1 is a schematic diagram illustrating an embodiment in accordance with the claimed subject matter.

FIG. 1 is a schematic diagram illustrating an embodiment in accordance with the claimed subject matter. This schematic portrays a first loop 102 and a second loop 104 that can be fed back to a memory controller. Likewise, the two loops are then compared and a delay is added to the strobe until it matches the loop time of the clock.

During a normal mode of operation, the first loop 102, the Strobe signal and Strobe# signal would drive 180 degrees out of phase. However, for another mode of operation for calibration, the Strobe signal is the drive and Strobe# signal receives the signal driven by Strobe signal. Likewise, the second loop 104 during a normal mode of operation, the clock signal and clock# signal would drive 180 degrees out of phase. However, for another mode of operation for calibration, the clock signal is the driver and clock# signal receives the signal driven by the clock signal. Subsequently, for the calibration mode of operation, the memory controller moves the strobe signal until the delay time of the first loop matches the loop time of the second loop. In one embodiment, the loops start at the MCH go through the motherboard, DIMM connecter, across the DIMM, through the DRAM and back to the MCH. Therefore, the claimed subject matter facilitates deskewing data to clock for a dynamic random access memory (DRAM), such as, a DDR3.

Figure 2:
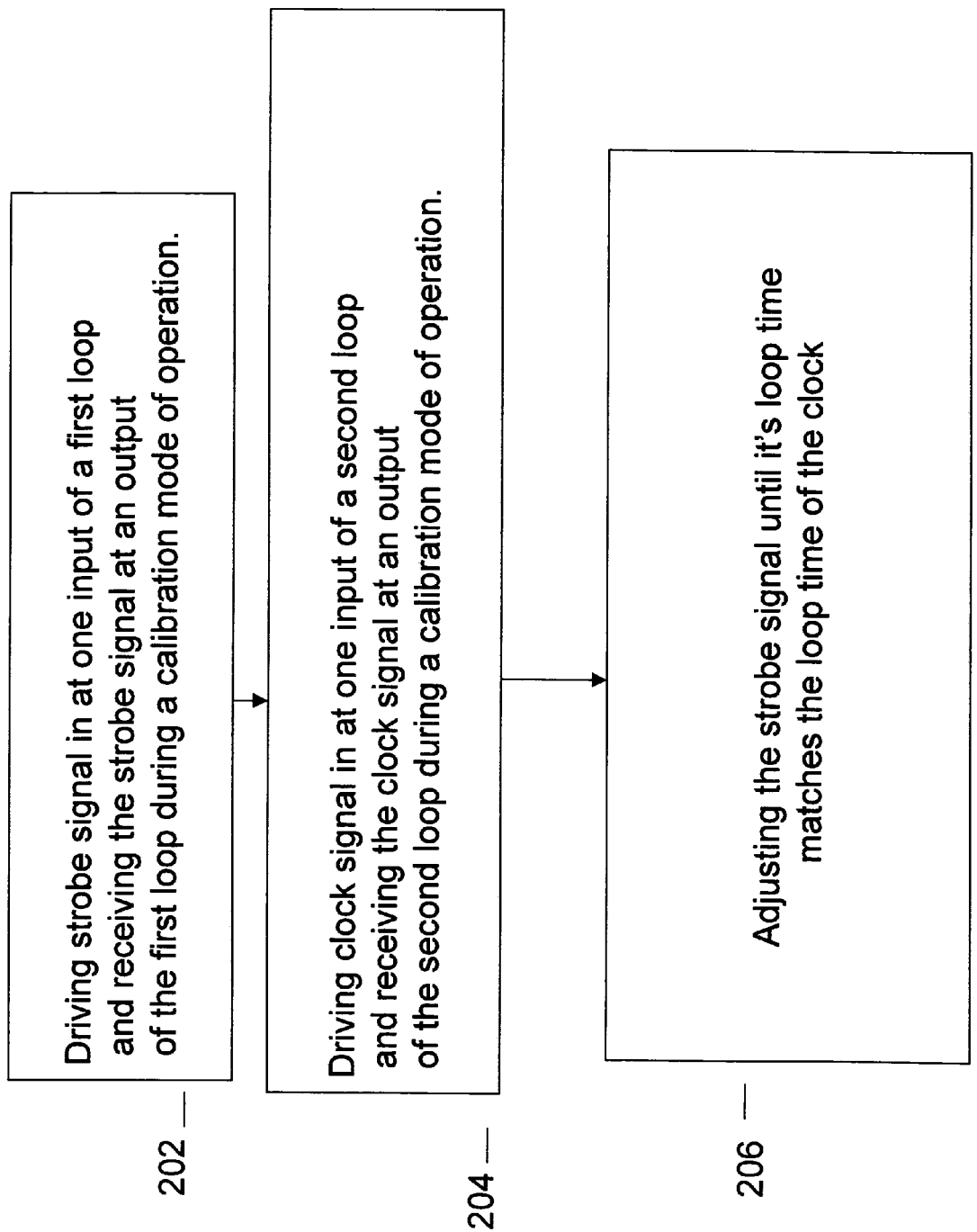
FIG. 2 is a flowchart of an embodiment of a method in accordance with the claimed subject matter.

FIG. 2 is a flowchart of an embodiment of a method in accordance with the claimed subject matter. The flowchart depicts three action blocks, 202, 204, and 206. In a first block 202, the method depicts driving strobe signal in at one input of a first loop and receiving the strobe signal at an output of the first loop during a calibration mode of operation. Likewise, a second block 204, the method depicts driving clock signal in at one input of a second loop and receiving the clock signal at an output of the second loop during a calibration mode of operation. At a last block 206, the method depicts adjusting the strobe signal until the flight time of the first loop matches the flight time of the second loop.

Figure 3:
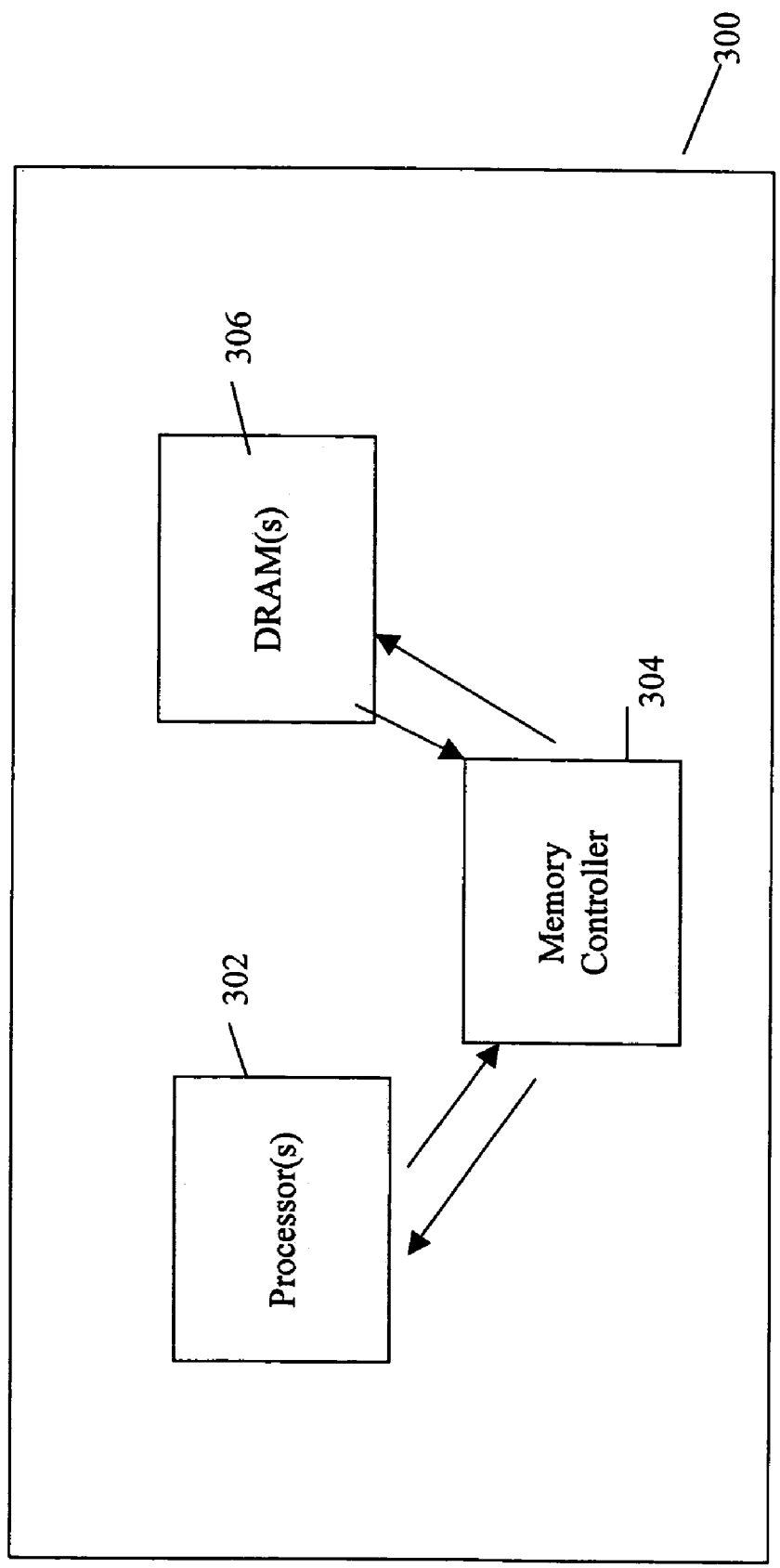
FIG. 3 is a schematic of a system in accordance with the claimed subject matter.

FIG. 3 depicts a system in accordance with one embodiment. The system 300 comprises a processor 302, a memory controller 304, and a DRAM 306. In one embodiment, the system 300 is a single processor system. In an alternative embodiment, the system comprises multiple processors 302. The processor decodes and executes instructions and requests data and directory information from the DRAM 306 via the memory controller 304.

In one embodiment, the system is a computer. In another embodiment, the system is a computing system, such as, a personal digital assistant (PDA), communication device, or Internet tablet. In one embodiment, the DRAM is a synchronous dynamic random access memory (SDRAM).

In one embodiment, the memory controller is an integrated device. In an alternative embodiment, a chipset includes the memory controller. The system supports the deskew data to clock apparatus and method discussed in connection with FIGS. 1 and 2.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An apparatus comprising:
 a first loop created by a differential strobe pair, wherein a strobe signal is driven along a first one of the differential strobe pair that is the drive and a second one of the differential strobe pair is to receive the strobe signal;
 a second loop created by a differential clock pair, wherein a clock signal is driven along a first one of the differential clock pair that is the drive and a second one of the differential clock pair is to receive the clock signal; and
 a controller to compare first and second flight times for the first and second loops, wherein the strobe signal is to be adjusted until a delay time of the first and second loops are equivalent.

2. The apparatus of claim 1, wherein the first and second loops extend from the controller, along a circuit board, to a memory device, and back to the controller.

3. The apparatus of claim 2, wherein the controller comprises a memory controller.

4. The apparatus of claim 1, wherein the differential strobe pair are to be driven out of phase during a non-calibration mode, and wherein the controller is to compare the first and second flight times during a calibration mode.

5. An apparatus comprising:
 a first loop extending from a memory controller to a memory and back to the memory controller, wherein a strobe signal on a strobe signal line and a strobe# signal on a strobe# signal line are to be driven out of phase during a first mode of operation, wherein the first loop is to drive the strobe signal along the first loop from the strobe signal line to the strobe# signal line during a second mode of operation;
 a second loop extending from the memory controller to the memory and back to the memory controller, wherein a clock signal on a clock signal line and a clock# signal on a clock# signal line are to be driven out of phase during the first mode of operation, wherein the second loop is to drive the clock signal along the second loop from the clock signal line to the clock# signal line during the second mode of operation; and
 a controller to compare first and second flight times for the first and second loops, and to adjust the strobe signal until a delay time of the first and second loops are equivalent.

6. The apparatus of claim 5, wherein the memory comprises a DDR3 dynamic random access memory.

7. The apparatus of claim 5, wherein the controller comprises a memory controller.

8. The apparatus of claim 5, wherein the signals are to be driven 180° out of phase.

9. A method comprising:
 driving a strobe signal from an input of a first loop in a memory controller, the first loop extending from the memory controller to a memory and back to the memory controller, and receiving the strobe signal at an output of the first loop in the memory controller during a calibration mode of operation, wherein the input of the first loop is for the strobe signal and the output of the first loop is for a differential strobe signal during a non-calibration mode of operation;
 driving a clock signal from an input of a second loop in the memory controller, the second loop extending from the memory controller to the memory and back to the memory controller, and receiving the clock signal at an output of the second loop in the memory controller during the calibration mode of operation, wherein the input of the second loop is for the clock signal and the output of the second loop is for a differential clock signal during a non-calibration mode of operation; and
 adjusting the strobe signal until a delay time of the first loop matches a delay time of the second loop.

10. The method of claim 9, further comprising comparing a first flight time for the first loop and a second flight time for the second loop.

\* \* \* \* \*